(12) United States Patent
Zhao (10) Patent No.: US 9,766,721 B2
(45) Date of Patent: Sep. 19, 2017

(54) METHOD, VIDEO TERMINAL, AND SYSTEM FOR REALIZING SIMPLE AIR MOUSE

(75) Inventor: Erik Zhao, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 433 days.

(21) Appl. No.: 14/400,540

(22) PCT Filed: Sep. 11, 2012

(86) PCT No.: PCT/CN2012/081221
§ 371 (c)(1),
(2), (4) Date: Nov. 11, 2014

(87) PCT Pub. No.: WO2013/097487
PCT Pub. Date: Jul. 4, 2013

(65) Prior Publication Data
US 2015/0130720 A1 May 14, 2015

(30) Foreign Application Priority Data
Dec. 27, 2011 (CN) .......................... 2011 1 0444085

(51) Int. Cl.
*G06F 3/033* (2013.01)
*G09G 5/08* (2006.01)
(Continued)

(52) U.S. Cl.
CPC .......... *G06F 3/03543* (2013.01); *G06F 3/005* (2013.01); *G06F 3/0325* (2013.01);
(Continued)

(58) Field of Classification Search
CPC combination set(s) only.
See application file for complete search history.

(56) References Cited

U.S. PATENT DOCUMENTS 6,317,118 B1 * 11/2001 Yoneno ................. G06F 3/0325
  345/156
2004/0046736 A1 * 3/2004 Pryor ...................... A63F 13/02
  345/156
(Continued)

FOREIGN PATENT DOCUMENTS

CN 101847316 A 9/2010
CN 201699853 U 1/2011

OTHER PUBLICATIONS

International Search Report of PCT Patent Application No. PCT/CN2012/081221 dated Dec. 20, 2012.
(Continued)

*Primary Examiner* — William Boddie
*Assistant Examiner* — Alecia D English (57) ABSTRACT

The present disclosure provides a method, a video system, and a system for realizing a simple air mouse. The method includes: a video terminal obtaining current position parameters of an air mouse, wherein the current position parameters comprise a deflection angle and a deflection direction of the air mouse with respect to an originally-calibrated coordinate position; and determining a position of a cursor on the video terminal according to the current position parameters and a preset scale parameter. By presetting reference points in the air mouse, the present disclosure obtains the deflection angle and the deflection direction of the air mouse with respect to the original position by the camera device based on the above reference points, and determines the position of the cursor on the video terminal according to the deflection angle and the deflection direction and the preset scale parameter.

6 Claims, 5 Drawing Sheets

(51) Int. Cl.
*G06F 3/0354* (2013.01)
*G06F 3/00* (2006.01)
*G06F 3/0346* (2013.01)
*H04N 21/422* (2011.01)
*H04N 21/4223* (2011.01)
*G06K 9/00* (2006.01)
*G06F 3/03* (2006.01)
*G06T 7/70* (2017.01)

(52) U.S. Cl.
CPC ........ *G06F 3/0346* (2013.01); *G06K 9/00711* (2013.01); *G06T 7/70* (2017.01); *H04N 21/4223* (2013.01); *H04N 21/42206* (2013.01)

(56) References Cited

U.S. PATENT DOCUMENTS

2009/0070065 A1     3/2009    Seko et al.
2009/0122146 A1     5/2009    Zalewski et al.

OTHER PUBLICATIONS

1st Office Action of counterpart European Patent Application No. 12861536.6 dated Jul. 21, 2016.

\* cited by examiner

METHOD, VIDEO TERMINAL, AND SYSTEM FOR REALIZING SIMPLE AIR MOUSE

BACKGROUND

1. Technical Field

The present invention relates to network television technologies, and particularly, to a method, a video terminal, and a system for realizing a simple air mouse.

2. Description of Related Art

With the development of the network television technology, a television not only can play videos but also can browse websites like a computer. However, a present controller of the television can no longer satisfy users' requirements due to the limit on the number of keys and the limit on the function thereof.

As an input device, an air mouse works as a mouse controller, integrates the function of the controller which points to the screen and the function of the mouse which supports multimedia applications, and is compatible with television applications and computer applications, thereby greatly improving using experience for users. The air mouse can be used to operate the cursor on the screen like a traditional mouse without being placed on any plane. To move the cursor on the screen of the television, a user only needs to move the air mouse in the air, which is convenient and easy. For example, in the office, the air mouse can work as a PPT pen so that the demonstrator can perform the mouse-related operations or page-turning operations by controlling the air mouse in the air without sitting at the meeting table and playing the computer.

However, most of the present air mouses are provided with gyroscopes and acceleration detection devices for controlling the moving speeds and the positions of the air mouses. These devices not only increase the cost of the air mouse, but also result in a larger error between the coordinates of the air mouse on the screen and the originally-calibrated coordinates of the air mouse, which affects the using experience for users.

SUMMARY

The main purpose of the invention is to provide a method, a video terminal, and a system for realizing a simple air mouse which are simple, low-cost, and can improve the accuracy of positioning a cursor on a screen of the terminal.

In order to achieve the above purpose, a method for realizing a simple air mouse is provided. Including:
- a video terminal obtaining current position parameters of an air mouse, wherein the current position parameters include a deflection angle and a deflection direction of the air mouse with respect to an originally-calibrated coordinate position; and
- determining a position of a cursor on the video terminal according to the current position parameters and a preset scale parameter, wherein the preset scale parameter is the ratio of a moving distance and a moving direction of the cursor on a screen of the video terminal to the deflection angle and the deflection direction of the air mouse.

Preferably, the step of a video terminal obtaining current position parameters of an air mouse includes:
- the video terminal scans a first reference point, a second reference point, and a third reference point preset in the air mouse through a camera device;
- calculating a current projecting area of a triangle on the camera device, wherein the triangle is formed by the first reference point, the second reference point, and the third reference point;
- calculating a deflection angle of a plane in which the triangle is located according to a current projecting area of the triangle and an original projecting area of the triangle, wherein the original projecting area is the projecting area of the triangle on the camera device when the first reference point, the second reference point, and the third reference point are respectively located at preset original positions; and
- obtaining the deflection direction of the triangle according to a rotating direction of a fourth reference point preset in the air mouse, wherein the fourth reference point is located outside the plane in which the triangle is located.

Preferably, the step of calculating a deflection angle of a plane in which the triangle is located according to a current projecting area of the triangle and an original projecting area of the triangle includes:
- setting one side of the triangle or a preset reference shaft outside the triangle as a rotating shaft;
- obtaining the original projecting area of the triangle and the current projecting area of the triangle after the triangle rotates;
- calculating the deflection angle of the plane in which the triangle is located according to the current projecting area and the original projecting area, and the deflection angle of the plane in which the triangle is located=90°−arcSin (the original projecting area/the current projecting area).

Preferably, the triangle is a right-angle triangle, wherein the step of calculating a deflection angle of a plane in which the triangle is located according to a current projecting area of the triangle and an original projecting area of the triangle includes:
- setting a first cathetus of the triangle as a rotating shaft;
- obtaining an original projecting length of a second cathetus of the triangle and a current projecting length of the second cathetus after the triangle rotates;
- calculating the deflection angle of the plane in which the triangle is located according to the original projecting length and the current projecting length of the second cathetus, and the deflection angle of the plane in which the triangle is located=90°−arcSin (the original projecting length/the current projecting length).

Preferably, the first reference point, the second reference point, the third reference point, and the fourth reference point are lighting reference points.

The present disclosure further provides a video terminal for realizing a simple air mouse, including:
- a position parameter obtaining module configured for obtaining current position parameters of an air mouse, wherein the current position parameters include a deflection angle and a deflection direction of the air mouse with respect to a originally-calibrated coordinate position; and
- a cursor positioning module configured for determining a position of a cursor on the video terminal according to the current position parameters and a preset scale parameter, wherein the preset scale parameter is the ratio of a moving distance and a moving direction of the cursor on a screen of the video terminal to the deflection angle and the deflection direction of the air mouse.

Preferably, the position parameter obtaining module includes:

a scanning unit configured for scanning a first reference point, a second reference point, and a third reference point preset in the air mouse through a camera device;

an area calculating unit configured for calculating a current projecting area of a triangle on the camera device, wherein the triangle is formed by the first reference point, the second reference point, and the third reference point;

a deflection angle calculating unit configured for calculating a deflection angle of a plane in which the triangle is located according to the current projecting area of the triangle and an original projecting area of the triangle, wherein the original projecting area is the projecting area of the triangle on the camera device when the first reference point, the second reference point, and the third reference point are respectively located at preset original positions; and a direction obtaining unit configured for obtaining the deflection direction of the triangle according to a rotating direction of a fourth reference point preset in the air mouse, wherein the fourth reference point is located outside the plane in which the triangle is located.

Preferably, the deflection angle calculating unit is further configured for:

setting one side of the triangle or a preset reference shaft outside the triangle as a rotating shaft;

obtaining the original projecting area of the triangle and the current projecting area of the triangle after the triangle rotates; and calculating the deflection angle of the plane in which the triangle is located according to the current projecting area and the original projecting area, and the deflection angle of the plane in which the triangle is located=90°−arcSin (the original projecting area/the current projecting area).

Preferably, the triangle is a right-angle triangle, and the deflection angle calculating unit is further configured for:

setting a first cathetus of the triangle as a rotating shaft;

obtaining an original projecting length of a second cathetus of the triangle and a current projecting length of the second cathetus after the triangle rotates; and calculating the deflection angle of the plane in which the triangle is located according to the original projecting length and the current projecting length of the second cathetus, and the deflection angle of the plane in which the triangle is located=90°−arcSin (the original projecting length/the current projecting length).

Preferably, the first reference point, the second reference point, and the third reference point are lighting reference points.

The present disclosure further yet provides a system for realizing a simple air mouse, including a video terminal and an air mouse being provided with at least four reference points, wherein the video terminal is configured for:

obtaining current position parameters of the air mouse according to the at least four reference points, and determining a position of a cursor on the video terminal according to the current position parameters and a preset scale parameter; wherein the current position parameters include a deflection angle and a deflection direction of the air mouse with respect to a originally-calibrated coordinate position, and the preset scale parameter is the ratio of a moving distance and a moving direction of the cursor on a screen of the video terminal to the deflection angle and the deflection direction of the air mouse.

Preferably, the system further includes a camera device connected to the video terminal for scanning the current position parameters of the air mouse and providing the current position parameters to the video terminal.

Preferably, the video terminal includes:

a position parameter obtaining module configured for obtaining current position parameters of an air mouse, wherein the current position parameters include a deflection angle and a deflection direction of the air mouse with respect to a originally-calibrated coordinate position; and a cursor positioning module configured for determining a position of a cursor on the video terminal according to the current position parameters and a preset scale parameter, wherein the preset scale parameter is the ratio of a moving distance and a moving direction of the cursor on a screen of the video terminal to the deflection angle and the deflection direction of the air mouse.

Preferably, the position parameter obtaining module includes:

a scanning unit configured for scanning a first reference point, a second reference point, and a third reference point preset in the air mouse through a camera device;

an area calculating unit configured for calculating a current projecting area of a triangle on the camera device, wherein the triangle is formed by the first reference point, the second reference point, and the third reference point;

a deflection angle calculating unit configured for calculating a deflection angle of a plane in which the triangle is located according to the current projecting area of the triangle and an original projecting area of the triangle, wherein the original projecting area is the projecting area of the triangle on the camera device when the first reference point, the second reference point, and the third reference point are respectively located at preset original positions; and a direction obtaining unit configured for obtaining the deflection direction of the triangle according to a rotating direction of a fourth reference point preset in the air mouse, wherein the fourth reference point is located outside the plane in which the triangle is located.

Preferably, the deflection angle calculating unit is further configured for:

setting one side of the triangle or a preset reference shaft outside the triangle as a rotating shaft;

obtaining the original projecting area of the triangle and the current projecting area of the triangle after the triangle rotates; and calculating the deflection angle of the plane in which the triangle is located according to the current projecting area and the original projecting area, and the deflection angle of the plane in which the triangle is located=90°−arcSin (the original projecting area/the current projecting area).

Preferably, the triangle is a right-angle triangle, and the deflection angle calculating unit is configured for:

setting a first cathetus of the triangle as a rotating shaft;

obtaining an original projecting length of a second cathetus of the triangle and a current projecting length of the second cathetus after the triangle rotates;

calculating the deflection angle of the plane in which the triangle is according to the original projecting length and the current projecting length of the second cathetus, and the deflection angle of the plane in which the triangle is located=90°−arcSin (the original projecting length/the current projecting length).

Preferably, the the first reference point, the second reference point, and the third reference point are lighting reference points.

The method, video terminal and system for realizing the simple air mouse provided in the present disclosure obtain the deflection angle and the deflection direction of the air mouse with respect to the original position by the camera device based on the above reference points, and adjust the position of the cursor on the video terminal according to the deflection angle and the deflection direction and the preset scale parameter. In this way, the complexity of the air mouse is greatly reduced. In addition, since the change of the coordinate data of the cursor on the screen is only relative to the deflection angle of the air mouse, the problem that the coordinates of the cursor are adjusted with respect to the originally-calibrated coordinate position due to the movement of the existing air mouse can be avoided, thereby improving the accuracy of positioning the cursor and further improving the using experience for users.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

The technical solution provided in an embodiment of the present disclosure is mainly as follows: obtaining a deflection angle and a deflection direction of an air mouse with respect to an original position by a lighting reference point built in the air mouse and a camera device, and adjusting a position of a cursor on a video terminal based on the deflection angle and the deflection direction and a preset scale parameter. The method can be easily implemented and can improve the accuracy of positioning the cursor.

The video terminal in the present disclosure can be any terminal with video and network function such as a network television. The following description is given in detail by taking a network television as an example.

Figure 1:
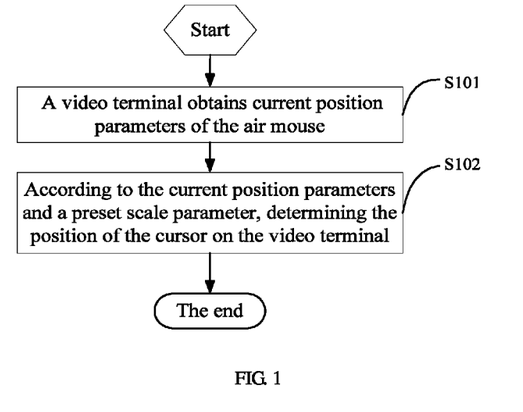
FIG. 1 is a flow chart of a method for realizing a simple air mouse in accordance with an embodiment of the present disclosure.

As shown in FIG. 1, a method for realizing a simple air mouse provided in an embodiment of the present disclosure includes steps as follows.

Step S101, a video terminal obtains current position parameters of the air mouse.

The network television, for example, is connected to the camera device or is provided with a camera module (the embodiment is based on that the network television is connected to the camera device). Meanwhile, four reference points are built in the air mouse. The four reference points can be four lighting reference points formed by four lighting devices.

The above four lighting reference points are defined to be the first, second, third, and fourth reference points. The first, second and third reference points form a triangle, and the fourth reference point is located at any position outside the plane in which the triangle formed by the first, second, and third reference points is.

In order to accurately position the position of the cursor on the screen of the network television, a respective original position is respectively set for the first, second, third, and fourth reference points. The original positions are used to define an originally-calibrated coordinate position of the air mouse. In the following description, the originally-calibrated coordinate position is used as a reference to determine the change of the position of the air mouse.

As the air mouse moves, the position of the air mouse with respect to the originally-calibrated coordinate position changes. In the embodiment, the change of the position of the air mouse is restricted by the deflection angle and the deflection direction of the air mouse with respect to the originally-calibrated coordinate position, and the deflection angle and the deflection direction of the air mouse are further used as the current position parameters of the air mouse.

The network television scans the first, second, and third reference points through the camera device and obtains a projecting area of an image formed on the camera device by the triangle, wherein the triangle is formed by the first, second, and third reference points.

The network television pre-stores an original projecting area of an image formed on the camera device by the triangle when the air mouse is located at the originally-calibrated coordinate position. After that, as the air mouse moves, the network television scans the first, second, and third reference points inside the air mouse through the camera device and obtains the current projecting area of the image formed on the camera device by the triangle.

After that, the deflection angle of the triangle with respect to the originally-calibrated coordinate position can be calculated according to the relationship between the original projecting area and the current projecting area.

The process for calculating the deflection angle can be as follows: setting one side of the triangle or a preset reference shaft outside the triangle as a rotating shaft; obtaining the original projecting area of the triangle and the current projecting area of the triangle after the triangle rotates; calculating the deflection angle of the plane in which the triangle is located according to the current projecting area and the original projecting area, wherein the deflection angle of the plane in which the triangle is located=90°−arcSin (the original projecting area/the current projecting area).

The above deflection angle of the plane in which the triangle is located is the deflection angle of the air mouse with respect to the originally-calibrated coordinate position. Meanwhile, the deflection direction of the triangle can be determined according to the position relationship between the fourth reference point and any point of the triangle formed by the first, second, and third reference points.

Figure 3A:
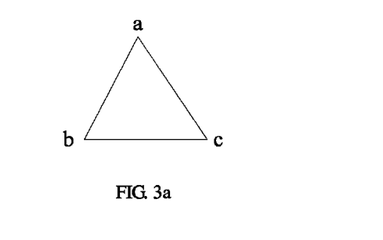
FIG. 3a is a schematic view showing a triangle provided in the method of FIG. 1 which is formed by a first reference point, a second reference point, and a third reference point built in the air mouse.

In detail, as shown in FIG. 3a which is a schematic view of the triangle formed by the first, second, and third reference points built in the air mouse, the first, second, and third reference points are respectively defined as a, b, and c in the embodiment.

In order to obtain the deflection angle of the air mouse, the deflection angles of the triangle formed by a, b, and c with respect to the horizontal direction and the vertical direction are respectively calculated at first. Then, the deflection angles of the triangle with respect to the horizontal direction and the vertical direction are synthesized to obtain the deflection angle of the air mouse. During the calculation of the deflection angles with respect to the horizontal direction and the vertical direction, the change of the area of the triangle can be calculated by calculating the change of a projecting length of each side of the triangle formed by a, b, and c; furthermore, according to the change of the area, the changes of the angles of the triangle with respect to the horizontal direction and the vertical direction can be calculated. In this way, the network television can calculate the accurate change of the angle of the triangle with respect to the originally-calibrated coordinate position.

Figure 3B:
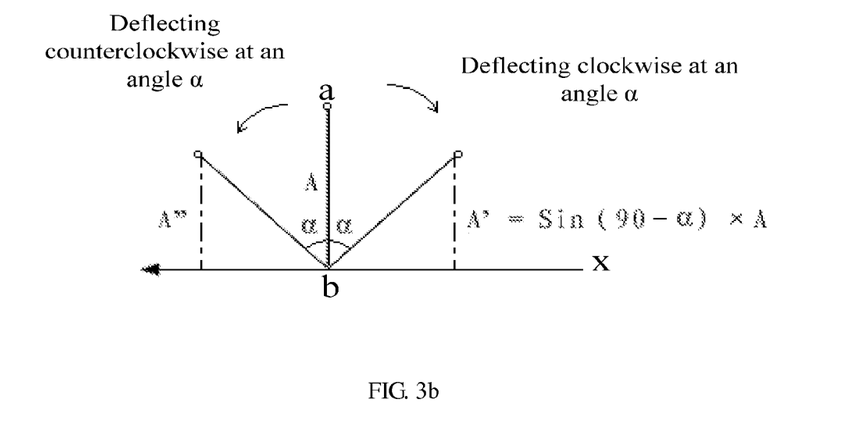
FIG. 3b is a schematic view showing the principle provided in the method of FIG. 1 for calculating a deflection angle of the air mouse.

Taking the vertical direction as an example, as shown in FIG. 3b which is a schematic view showing the principle for calculating the deflection angle of the air mouse, when the deflection angle is calculated, one side of the triangle is set as the rotating shaft, or a reference rotating shaft can be set outside the triangle. A length A refers to an original projecting distance (image side) of the side ab of the triangle on a projecting plane (horizontal plane) of the camera device. For convenient calculation, in the embodiment, the triangle is set to include a bottom which is perpendicular to the side ab, that is, the side ab is a cathetus; the bottom side is set as the rotating shaft; and the bottom side is perpendicular to the X axis of the projecting plane in FIG. 3b. Therefore, in the embodiment, the change of the area of the triangle can be reflected by the change of the length of the side ab.

When the triangle deflects with respect to the vertical direction, for example, deflects clockwise with reference to FIG. 3b at an angle α, the projecting distance of the side ab on the camera device becomes A'. According to known formula, the relationship between A and A' can be expressed as: A'=Sin (90−α)*A. From this, it can be concluded that:

the deflection angle α=90°−arcSin (A'/A).

As for the situation that the triangle deflects counterclockwise with respect to the vertical direction, the deflection angle α can also be calculated according to the above formula. If the triangle deflects counterclockwise with reference to FIG. 3b at an angle α, the projecting distance of the side ab on the camera device becomes A". According to known formula, the relationship between A and A" can be expressed as A"=Sin (90−α)*A. From this, it can be concluded that:

the deflection angle α=90°−arcSin (A"/A).

Similarly, when the triangle deflects with respect to the horizontal direction, the deflection angle can also be calculated according to the above formula.

Through the above formulas, it can be concluded that when the triangle deflects with respect to the vertical direction at the same angle α, regardless of clockwise or counterclockwise, the change of the length of A at the two situations are identical to each other. Thus, the deflection direction of the triangle needs to be determined.

Figure 3C:
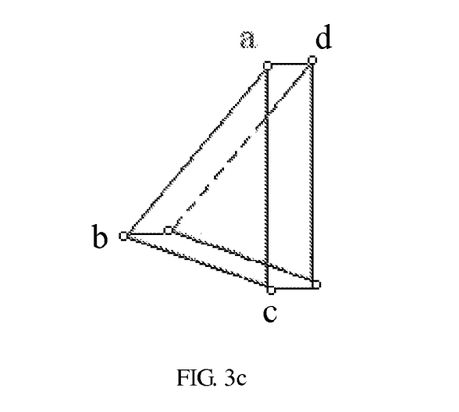
FIG. 3c is a schematic view showing the principle provided in the method of FIG. 1 for judging a deflection direction of the air mouse.

FIG. 3c shows the principle for determining the deflection direction of the air mouse in accordance with an embodiment of the present disclosure.

Figure 3D:
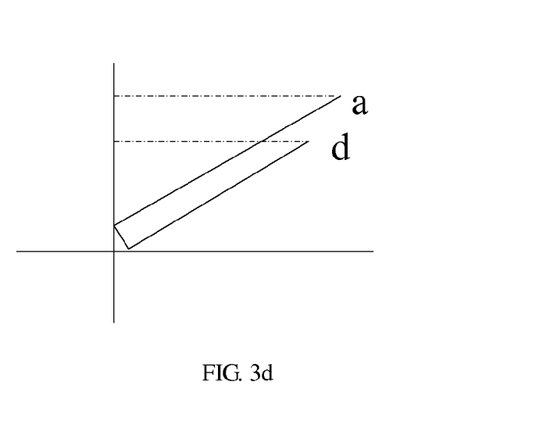
FIG. 3d is a schematic view showing the principle provided in the method of FIG. 1 for determining that the triangle deflects clockwise.
Figure 3E:
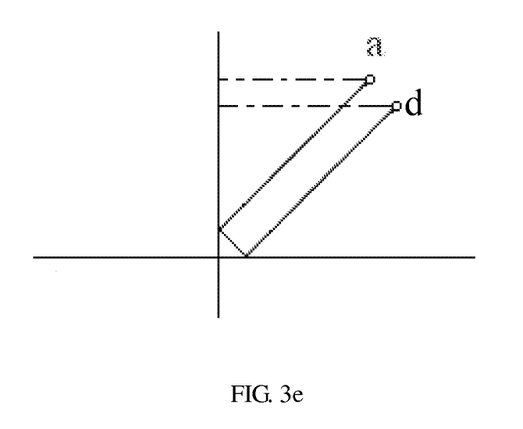
FIG. 3e is a schematic view showing the principle provided in the method of FIG. 1 for determining that the triangle deflects counterclockwise.

In order to determining the deflection direction of the triangle, the fourth reference point is introduced. If the triangle deflects clockwise (with reference to FIG. 3c, clockwise means extending outwards from point a), an image point of point a is located above point d, as shown in FIG. 3d; if the triangle deflects counterclockwise, an image point of point d is located above point a, as shown in FIG. 3e. In this way, the deflection direction of the air mouse with respect to the horizontal direction and the vertical direction can be determined.

Step S102, according to the current position parameters and a preset scale parameter, determining the position of the cursor on the video terminal.

After the current position parameters including the deflection angle and the deflection direction of the air mouse with respect to the originally-calibrated coordinate position are obtained, the position of the cursor on the screen of the network television can be correspondingly adjusted according to the deflection angle and the deflection direction.

Typically, a network television is provided with a scale parameter corresponding to relationship between the deflection angle and the deflection direction of the air mouse and the movement of the position of the cursor on the screen. The scale parameter is equal to the ratio of the moving distance and the moving direction of the cursor on the screen to the deflection angle and the deflection direction of the air mouse. Thus, according to the deflection angle and the deflection direction of the air mouse, the position of the cursor on the screen of the network television can be synchronously adjusted to realize the accurate positioning of the cursor.

Figure 2:
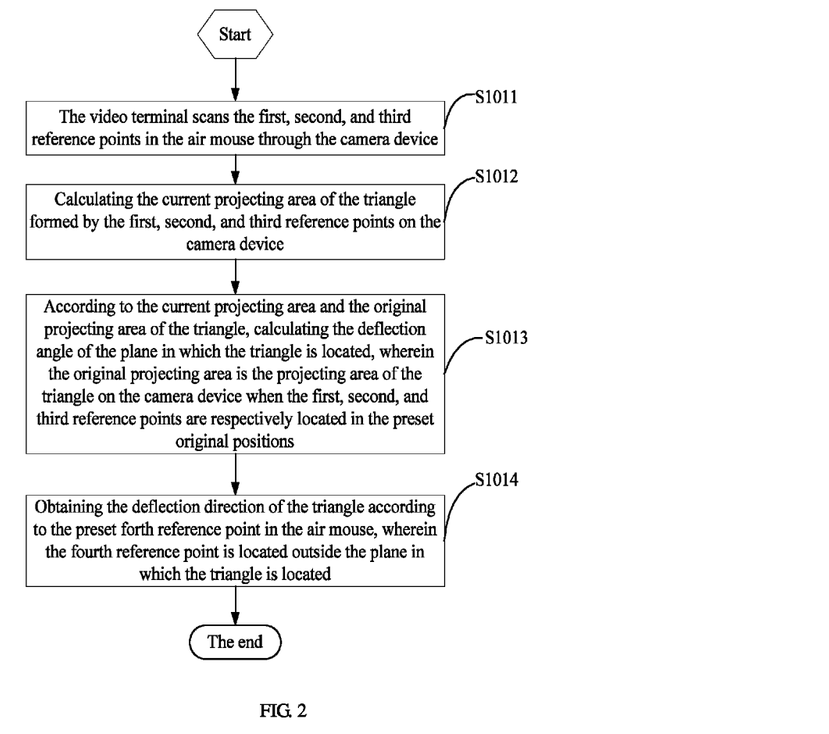
FIG. 2 is a flow chart showing the step of the method of FIG. 1 that a video terminal obtains current position parameters of the air mouse.

In detail, as shown in FIG. 2, the above step S101 includes:

step S1011, the video terminal scans the first, second, and third reference points in the air mouse through the camera device;

step S1012, calculating the current projecting area of the triangle formed by the first, second, and third reference points on the camera device;

step S1013, according to the current projecting area and the original projecting area of the triangle, calculating the deflection angle of the plane in which the triangle is located, wherein the original projecting area is the projecting area of the triangle on the camera device when the first, second, and third reference points are respectively located in the preset original positions; and step S1014, obtaining the deflection direction of the triangle according to the preset forth reference point in the air mouse, wherein the fourth reference point is located outside the plane in which the triangle is located.

Compared to the existing technology, the technical solution of the embodiment greatly reduces the complexity of the air mouse; in addition, since the change of the coordinate data of the cursor on the screen is only relative to the deflection angle of the air mouse, the problem that the coordinates of the cursor are adjusted with respect to the originally-calibrated coordinate position due to the movement of the existing air mouse can be avoided, thereby improving the accuracy of positioning the cursor and further improving the using experience for users.

Figure 4:
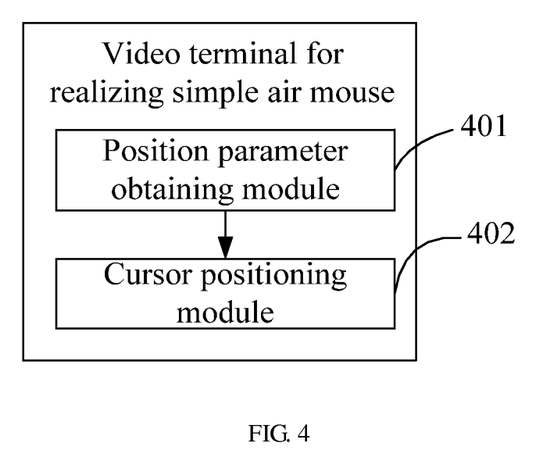
FIG. 4 is a schematic view of a video terminal for realizing a simple air mouse in accordance with an embodiment of the present disclosure.

As shown in FIG. 4, a video terminal for realizing a simple air mouse is provided. The video terminal includes a position parameter obtaining module 401 and a cursor positioning module 402.

The position parameter obtaining module 401 is configured for obtaining current position parameters of the air mouse.

The cursor positioning module 402 is configured for adjusting a position of a cursor on the video terminal according to the current position parameters and a preset scale parameter.

Taking a network television as an example, the network television is connected to the camera device or is provided with a camera module (the embodiment is based on that the network television is connected to the camera device). Meanwhile, four reference points are built in the air mouse. The four reference points can be four lighting reference points formed by four lighting devices.

The above four lighting reference points are defined to be the first, second, third, and fourth reference points. The first, second and third reference points form a triangle, and the fourth reference point is located at any position outside the plane in which the triangle formed by the first, second, and third reference points is located.

In order to accurately position the position of the cursor on a screen of the network television, a respective original position is set for the first, second, third, and fourth reference points. The original positions are used to define an originally-calibrated coordinate position of the air mouse. In the following description, the originally-calibrated coordinate position is used as a reference to determine the change of the position of the air mouse.

As the air mouse moves, the position of the air mouse changes with respect to the originally-calibrated coordinate position. In the embodiment, the change of the position of the air mouse is restricted by the deflection angle and the deflection direction of the air mouse with respect to the originally-calibrated coordinate position, and the deflection angle and the deflection direction of the air mouse are further used as the current position parameters of the air mouse.

The position parameter obtaining module 401 in the network television scans the first, second, and third reference points through the camera device and obtains a projecting area of an image formed on the camera device by the triangle, wherein the triangle is formed by the first, second, and third reference points.

The network television pre-stores an original projecting area of an image formed on the camera device by the triangle when the air mouse is located at the originally-calibrated coordinate position. After that, as the air mouse moves, the network television scans the first, second, and third reference points inside the air mouse through the camera device and obtains a current projecting area of the image formed on the camera device by the triangle.

After that, the deflection angle of the triangle with respect to the originally-calibrated coordinate position can be calculated according to the relationship between the original projecting area and the current projecting area.

The process for calculating the deflection angle can be as follows: setting one side of the triangle or a preset reference shaft outside the triangle as a rotating shaft; obtaining the original projecting area of the triangle and the current projecting area after the triangle rotates; calculating the deflection angle of the plane in which the triangle is located according to the current projecting area and the original projecting area, wherein the deflection angle of the plane in which the triangle is located=90°−arcSin (the original projecting area/the current projecting area).

The above deflection angle of the plane in which the triangle is located is the deflection angle of the air mouse with respect to the originally-calibrated coordinate position. Meanwhile, the deflection direction of the triangle can be determined according to the position relationship between the fourth reference point and any point of the triangle formed by the first, second, and third reference points.

In detail, as shown in FIG. 3a which is a schematic view of the triangle formed by the first, second, and third reference points built in the air mouse, the first, second, and third reference points are respectively defined as a, b, and c in the embodiment.

In order to obtain the deflection angle of the air mouse, the deflection angles of the triangle formed by a, b, and c with respect to the horizontal direction and the vertical direction are respectively calculated at first. Then, the deflection angles of the triangle with respect to the horizontal direction and the vertical direction are synthesized to obtain the deflection angle of the air mouse. During the calculation of the deflection angles with respect to the horizontal direction and the vertical direction, the change of the area of the triangle can be calculated by calculating the change of a projecting length of each side of the triangle formed by a, b, and c; furthermore, according to the change of the area, the changes of the angles of the triangle with respect to the horizontal direction and the vertical direction can be calculated. In this way, the network television can calculate the accurate change of the angle of the triangle with respect to the originally-calibrated coordinate position.

Taking the vertical direction as an example, as shown in FIG. 3b which is a schematic view showing the principle for calculating the deflection angle of the air mouse, when the deflection angle is calculated, one side of the triangle is set as the rotating shaft, or a reference rotating shaft can be set outside the triangle. A length A refers to an original projecting distance (image side) of the side ab of the triangle on a projecting plane (horizontal plane) of the camera device. For convenient calculation, in the embodiment, the triangle is set to include a bottom which is perpendicular to the side ab, that is, the side ab is a cathetus; the bottom side is set as the rotating shaft; and the bottom side is perpendicular to the X axis of the projecting plane in FIG. 3b. Therefore, in the embodiment, the change of the area of the triangle can be reflected by the change of the length of the side ab.

When the triangle deflects with respect to the vertical direction, for example, deflects clockwise with reference to FIG. 3b at an angle $\alpha$, the projecting distance of the side ab on the camera device becomes A'. According to known formula, the relationship between A and A' can be expressed as: $A'=\sin(90-\alpha)*A$. From this, it can be concluded that:

the deflection angle $\alpha=90°-\arcsin(A'/A)$.

As for the situation that the triangle deflects counterclockwise with respect to the vertical direction, the deflection angle $\alpha$ can also be calculated according to the above formula. If the triangle deflects counterclockwise with reference to FIG. 3b at an angle α, the projecting distance of the side ab on the camera device becomes A". According to known formula, the relationship between A and A" can be expressed as A"=Sin (90−α)*A. From this, it can be concluded that:

the deflection angle α=90°−arcSin (A"/A).

Similarly, when the triangle deflects with respect to the horizontal direction, the deflection angle can also be calculated according to the above formula.

Through the above formulas, it can be concluded that when the triangle deflects with respect to the vertical direction at the same angle α, regardless of clockwise or counterclockwise, the change of the length of A at the two situations are identical to each other. Thus, the deflection direction of the triangle needs to be determined.

FIG. 3c shows the principle for determining the deflection direction of the air mouse in accordance with an embodiment of the present disclosure.

In order to determining the deflection direction of the triangle, the fourth reference point is introduced. If the triangle deflects clockwise (with reference to FIG. 3c, clockwise means extending outwards from point a), an image point of point a is located above point d, as shown in FIG. 3d; if the triangle deflects counterclockwise, an image point of point d is located above point a, as shown in FIG. 3e. In this way, the deflection direction of the air mouse with respect to the horizontal direction and the vertical direction can be determined.

After the position parameter obtaining module 401 obtains the current position parameters including the deflection angle and the deflection direction of the air mouse with respect to the originally-calibrated coordinate position, the cursor positioning module 402 adjusts the position of the cursor on the screen of the network television according to the deflection angle and the deflection direction.

Typically, a network television is provided with a scale parameter corresponding to relationship between the deflection angle and the deflection direction of the air mouse and the movement of the position of the cursor on the screen. The scale parameter is equal to the ratio of the moving distance and the moving direction of the cursor on the screen to the deflection angle and the deflection direction of the air mouse. Thus, according to the deflection angle and the deflection direction of the air mouse, the position of the cursor on the screen of the network television can be synchronously adjusted to realize the accurate positioning of the cursor.

Figure 5:
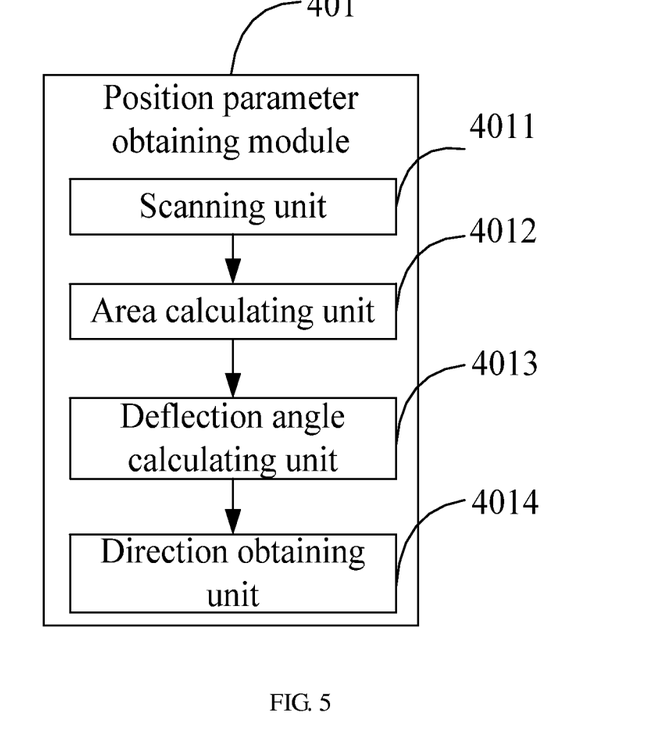
FIG. 5 is a position parameter obtaining module of the video terminal of FIG. 4.

In detail, as shown in FIG. 5, the position parameter obtaining module 401 includes a scanning unit 4011, an area calculating unit 4012, a deflection angle calculating unit 4013, and a direction obtaining unit 4014.

The scanning unit 4011 is configured for scanning the preset first, second, and third reference points through the camera device;

the area calculating unit 4012 is configured for calculating the current projecting area of the triangle formed by the first, second, and third reference points on the camera device;

the deflection angle calculating unit 4013 is configured for calculating the deflection angle of the plane in which the triangle is located according to the current projecting area and the original projecting area, wherein the original projecting area is the projecting area of the triangle on the camera device when the first, second, and third reference points are respectively located at the original positions; and The direction obtaining unit 4014 is configured for obtaining the deflection direction of the triangle according to the fourth reference point preset in the air mouse, wherein the fourth reference point is located outside the plane in which the triangle is located.

Figure 6:
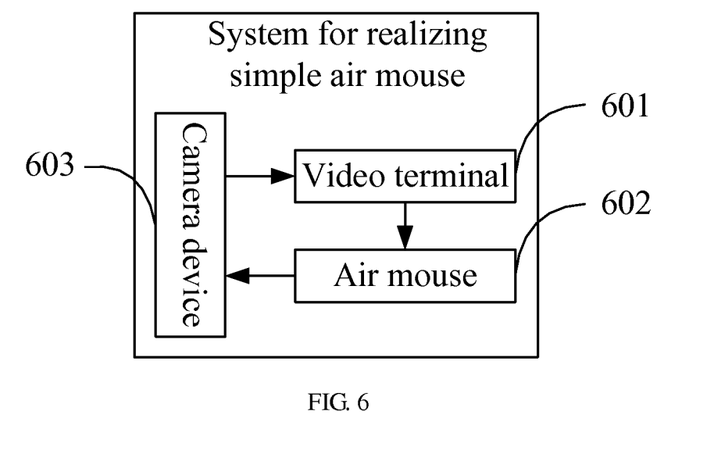
FIG. 6 is a schematic view of a system for realizing a simple air mouse in accordance with an embodiment of the present disclosure.

As shown in FIG. 6, the present disclosure further provides a system for realizing a simple air mouse, including: a video terminal 601, an air mouse 602, and a camera device 603 connected to the video terminal 601. The air mouse is provided with at least three reference points.

The video terminal 601 is configured for obtaining current position parameters of the air mouse 602, and adjusting the position of a cursor on the video terminal 601 according to the current position parameters and a preset scale parameter.

The camera device 603 is configured for scanning the current position parameters of the air mouse 602 and providing the current position parameters to the video terminal.

In other embodiments, the camera device 603 may also be replaced by a camera module built in the video terminal 601.

The video terminal 601 in this embodiment can be the video terminal in the above embodiments, which is not given in detail herein.

The method, video terminal and system for realizing the simple air mouse provided in the present disclosure obtain the deflection angle and the deflection direction of the air mouse with respect to the original position by the camera device based on the above reference points, and adjust the position of the cursor on the video terminal according to the deflection angle and the deflection direction and the preset scale parameter. In this way, the complexity of the air mouse is greatly reduced. In addition, since the change of the coordinate data of the cursor on the screen is only relative to the deflection angle of the air mouse, the problem that the coordinates of the cursor are adjusted with respect to the originally-calibrated coordinate position due to the movement of the existing air mouse can be avoided, thereby improving the accuracy of positioning the cursor and further improving the using experience for users.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A method for realizing a simple air mouse, comprising:
obtaining, by a video terminal, current position parameters of an air mouse, wherein the current position parameters comprise a deflection angle and deflection direction of the air mouse with respect to an originally-calibrated coordinate position; and
determining a position of a cursor on the video terminal according to the current position parameters and a preset scale parameter, wherein the preset scale parameter is the ratio of a moving distance and a moving direction of the cursor on a screen of the video terminal to the deflection angle and the deflection direction of the air mouse,
wherein obtaining the current position parameters of the air mouse comprises:
scanning, by the video terminal, a first reference point, a second reference point, and a third reference point preset in the air mouse through a camera device;

calculating a current projecting area of a triangle on the camera device, wherein the triangle is formed by the first reference point, the second reference point, and the third reference point;

calculating a deflection angle of a plane in which the triangle is located according to a current projecting area of the triangle and an original projecting area of the triangle, wherein the original projecting area is the projecting area of the triangle on the camera device when the first reference point, the second reference point, and the third reference point are respectively located at preset original positions; and obtaining the deflection direction of the triangle according to a rotating direction of a fourth reference point preset in the air mouse, wherein the fourth reference point is located outside the plane in which the triangle is located, the step of calculating a deflection angle of a plane in which the triangle is located according to a current projecting area of the triangle and an original projecting area of the triangle comprises:

setting one side of the triangle or a preset reference shaft outside the triangle as a rotating shaft;

obtaining the original projecting area of the triangle and the current projecting area of the triangle after the triangle rotates; and calculating the deflection angle of the plane in which the triangle is located according to the current projecting area and the original projecting area, and the deflection angle of the plane in which the triangle is located=90°−arcSin (the original projecting area/the current projecting area), the triangle is a right-angle triangle, wherein the step of calculating a deflection angle of a plane in which the triangle is located according to a current projecting area of the triangle and a original projecting area of the triangle comprises:

setting a first cathetus of the triangle as a rotating shaft;

obtaining an original projecting length of a second cathetus of the triangle and a current projecting length of the second cathetus after the triangle rotates; and calculating the deflection angle of the plane in which the triangle is located according to the original projecting length and the current projecting length of the second cathetus, and the deflection angle of the plane in which the triangle is located=90°−arcSin (the original projecting length/the current projecting length).

2. The method of claim 1, wherein the first reference point, the second reference point, the third reference point, and the fourth reference point are lighting reference points.

3. A video terminal for realizing a simple air mouse, comprising:

a position parameter obtaining module configured for obtaining current position parameters of an air mouse, wherein the current position parameters comprise a deflection angle and a deflection direction of the air mouse with respect to a originally-calibrated coordinate position; and a cursor positioning module configured for determining a position of a cursor on the video terminal according to the current position parameters and a preset scale parameter, wherein the preset scale parameter is the ratio of a moving distance and a moving direction of the cursor on a screen of the video terminal to the deflection angle and the deflection direction of the air mouse, wherein the position parameter obtaining module comprises:

a scanning unit configured for scanning a first reference point, a second reference point, and a third reference point preset in the air mouse through a camera device;

an area calculating unit configured for calculating a current projecting area of a triangle on the camera device, wherein the triangle is formed by the first reference point, the second reference point, and the third reference point;

a deflection angle calculating unit configured for calculating a deflection angle of a plane in which the triangle is located according to the current projecting area of the triangle and an original projecting area of the triangle, wherein the original projecting area is the projecting area of the triangle on the camera device when the first reference point, the second reference point, and the third reference point are respectively located at preset original positions; and a direction obtaining unit configured for obtaining the deflection direction of the triangle according to a rotating direction of a fourth reference point preset in the air mouse, wherein the fourth reference point is located outside the plane in which the triangle is located, the triangle is a right-angle triangle, and the deflection angle calculating unit is further configured for:

setting a first cathetus of the triangle as a rotating shaft;

obtaining an original projecting length of a second cathetus of the triangle and a current projecting length of the second cathetus after the triangle rotates; and calculating the deflection angle of the plane in which the triangle is located according to the original projecting length and the current projecting length of the second cathetus, and the deflection angle of the plane in which the triangle is located=90°−arcSin (the original projecting length/the current projecting length).

4. The video terminal of claim 3, wherein the first reference point, the second reference point, and the third reference point are lighting reference points.

5. A system for realizing a simple air mouse, comprising a video terminal and an air mouse being provided with at least four reference points, wherein the video terminal is configured for:

obtaining current position parameters of the air mouse according to the at least four reference points, and determining a position of a cursor on the video terminal according to the current position parameters and a preset scale parameter; wherein the current position parameters comprise a deflection angle and a deflection direction of the air mouse with respect to a originally-calibrated coordinate position, and the preset scale parameter is the ratio of a moving distance and a moving direction of the cursor on a screen of the video terminal to the deflection angle and the deflection direction of the air mouse, wherein, the system further comprises a camera device connected to the video terminal for scanning the current position parameters of the air mouse and providing the current position parameters to the video terminal;

the video terminal comprises:

a position parameter obtaining module configured for obtaining current position parameters of an air mouse, wherein the current position parameters comprise a deflection angle and a deflection direction of the air mouse with respect to a originally-calibrated coordinate position; and a cursor positioning module configured for determining a position of a cursor on the video terminal according to the current position parameters and a preset scale parameter, wherein the preset scale parameter is the ratio of a moving distance and a moving direction of the cursor on a screen of the video terminal to the deflection angle and the deflection direction of the air mouse, the position parameter obtaining module comprises:

a scanning unit configured for scanning a first reference point, a second reference point, and a third reference point preset in the air mouse through a camera device;

an area calculating unit configured for calculating a current projecting area of a triangle on the camera device, wherein the triangle is formed by the first reference point, the second reference point, and the third reference point;

a deflection angle calculating unit configured for calculating a deflection angle of a plane in which the triangle is located according to the current projecting area of the triangle and an original projecting area of the triangle, wherein the original projecting area is the projecting area of the triangle on the camera device when the first reference point, the second reference point, and the third reference point are respectively located at preset original positions; and a direction obtaining unit configured for obtaining the deflection direction of the triangle according to a rotating direction of a fourth reference point preset in the air mouse, wherein the fourth reference point is located outside the plane in which the triangle is located.

6. The system of claim 5, wherein the first reference point, the second reference point, and the third reference point are lighting reference points.

* * * * *